(12) United States Patent
    Fullarton

(10) Patent No.: US 8,925,045 B2
(45) Date of Patent: Dec. 30, 2014

(54) ELECTRONIC RENDEZVOUS-BASED TWO STAGE ACCESS CONTROL FOR PRIVATE NETWORKS

(71) Applicant: Futurewei Technologies, Inc., Plano, TX (US)

(72) Inventor: Paul Fullarton, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/729,823

(22) Filed: Dec. 28, 2012

(65) Prior Publication Data

US 2014/0189800 A1    Jul. 3, 2014

(51) Int. Cl.
    *G06F 7/04*      (2006.01)
    *H04L 29/06*     (2006.01)
(52) U.S. Cl.
    CPC .............. *H04L 63/105* (2013.01); *H04L 63/08* (2013.01); *H04L 63/029* (2013.01); *H04L 63/0884* (2013.01)
    USPC .......................................................... 726/4
(58) Field of Classification Search
    CPC .... H04L 63/08; H04L 62/102; G06F 21/6218
    USPC .......................................................... 726/4
    See application file for complete search history.

(56) References Cited

U.S. PATENT DOCUMENTS

| | | | |
|---|---|---|---|
| 2004/0083297 A1* | 4/2004 | Gazzetta et al. | 709/229 |
| 2004/0219913 A1* | 11/2004 | Lee et al. | 455/426.1 |
| 2006/0045068 A1* | 3/2006 | Wu et al. | 370/352 |
| 2008/0052769 A1* | 2/2008 | Leone et al. | 726/7 |
| 2011/0119490 A1* | 5/2011 | Kaal et al. | 713/169 |
| 2012/0023325 A1* | 1/2012 | Lai | 713/155 |
| 2012/0222106 A1* | 8/2012 | Kuehl | 726/11 |

FOREIGN PATENT DOCUMENTS

| | | |
|---|---|---|
| CN | 102143136 A | 8/2011 |
| JP | 2012019455 A | 1/2012 |
| WO | 2008067113 A2 | 6/2008 |

OTHER PUBLICATIONS

Mizuno, Shintaro, et al., "A New Remote Configurable Firewall System for Home-use Gateways," Consumer Communications and Networking Conference, Jan. 2005, 3 pages.

(Continued)

*Primary Examiner* — Teshome Hailu
(74) *Attorney, Agent, or Firm* — Conley Rose, P.C.; Grant Rodolph; William H. Dietrich

(57) ABSTRACT

A method for providing access to a private network resource comprises receiving an indication from an electronic rendezvous service that a client application has passed a first set of authentication and authorization processes. A request to access the private network resource is received from the client application. The client application is allowed to attempt to perform a second set of authentication and authorization processes based at least in part on receiving the indication from the electronic rendezvous service that the client application has passed the first set of authentication and authorization processes. The second set of authentication and authorization processes are performed, and the client application is allowed to access the private network resource at least in part on a determination that the client application has passed the first and the second sets of authentication and authorization processes.

10 Claims, 8 Drawing Sheets

(56) References Cited

OTHER PUBLICATIONS

Cisco Systems, Inc., "Lock-and-Key: Dynamic Access Lists," Cisco IOS Firewall Feature, http://www.cisco.com/en/US/tech/tk583/tk822/technologies_tech_note09186a0080094524.shtml, Jul. 12, 2006, 16 pages.

Maki, Teemu, "Explicit Mechanisms for Controlling NAT/Firewall Systems Dynamically," TKK T-110.5190 Seminar on Internetworking, Mar. 2007, 6 pages.

Saito, M., et al., "Analysis of Rendezvous Mechanism for Home Access Using SIP," draft-saito-sip-rendezvous-00, Jan. 29, 2008, 15 pages.

Foreign Communication From A Counterpart Application, PCT Application No. PCT/CN2013/090749, International Search Report dated Apr. 3, 2014, 6 pages.

Foreign Communication From A Counterpart Application, PCT Application No. PCT/CN2013/090749, Written Opinion dated Apr. 3, 2014, 5 pages.

\* cited by examiner

ELECTRONIC RENDEZVOUS-BASED TWO STAGE ACCESS CONTROL FOR PRIVATE NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A private network commonly includes a collection of computers and other devices that are communicatively coupled to each other using a private address space. For example, each device in the private network can have a private address within the private address space, and the devices can use the private addresses to share information and resources within the private network. However, when a device within a private network needs to communicate with a device over a public network (e.g., a device that is not within the private network), the device within the private network will generally use a router. Routers forward data packets between private networks and public networks using network address translation (NAT) modules that translate between addresses in the private address space and addresses in the public address space.

Routers may include a firewall that restricts communications between the private network and the public network based on a predetermined set of rules. For example, a router can use a firewall to determine a source and/or a destination of a data packet and can prevent data packets coming from or going to a particular source and/or destination. Accordingly, firewalls can increase the security of a private network by controlling communications between devices within the private network and devices over the public network. However, firewalls may be susceptible to being bypassed or "hacked," which can result in the security of a private network being compromised.

SUMMARY

In one embodiment, the disclosure includes a method for providing access to a private network resource that comprises receiving an indication from an electronic rendezvous service that a client application has passed a first set of authentication and authorization processes. A request to access the private network resource is received from the client application. The client application is allowed to attempt to perform a second set of authentication and authorization processes based at least in part on receiving the indication from the electronic rendezvous service that the client application has passed the first set of authentication and authorization processes. The second set of authentication and authorization processes are then performed, and the client application is allowed to access the private network resource based at least in part on a determination that the client application has passed the first set of authentication and authorization processes and the second set of authentication and authorization processes.

In another embodiment, the disclosure includes an apparatus for providing access to a private network resource that comprises an interface and a processor. The interface is configured to receive an indication from an electronic rendezvous service that a client application has passed a first set of authentication and authorization processes. The processor is configured to perform a second set of authentication and authorization processes and enable the client application to access the private network resource based at least in part on a determination that the client application has passed the first set of authentication and authorization processes and the second set of authentication and authorization processes.

In yet another embodiment, the disclosure includes an apparatus for providing access to a private network resource that comprises a processor. The processor is configured to receive a request to access the private network resource from a client application and receive authentication and authorization information from the client application. The processor is configured to perform a set of authentication and authorization processes using the authentication and authorization information from the client application, and the processor is configured to transmit a message to the private network indicating that the client application has passed the set of authentication and authorization processes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
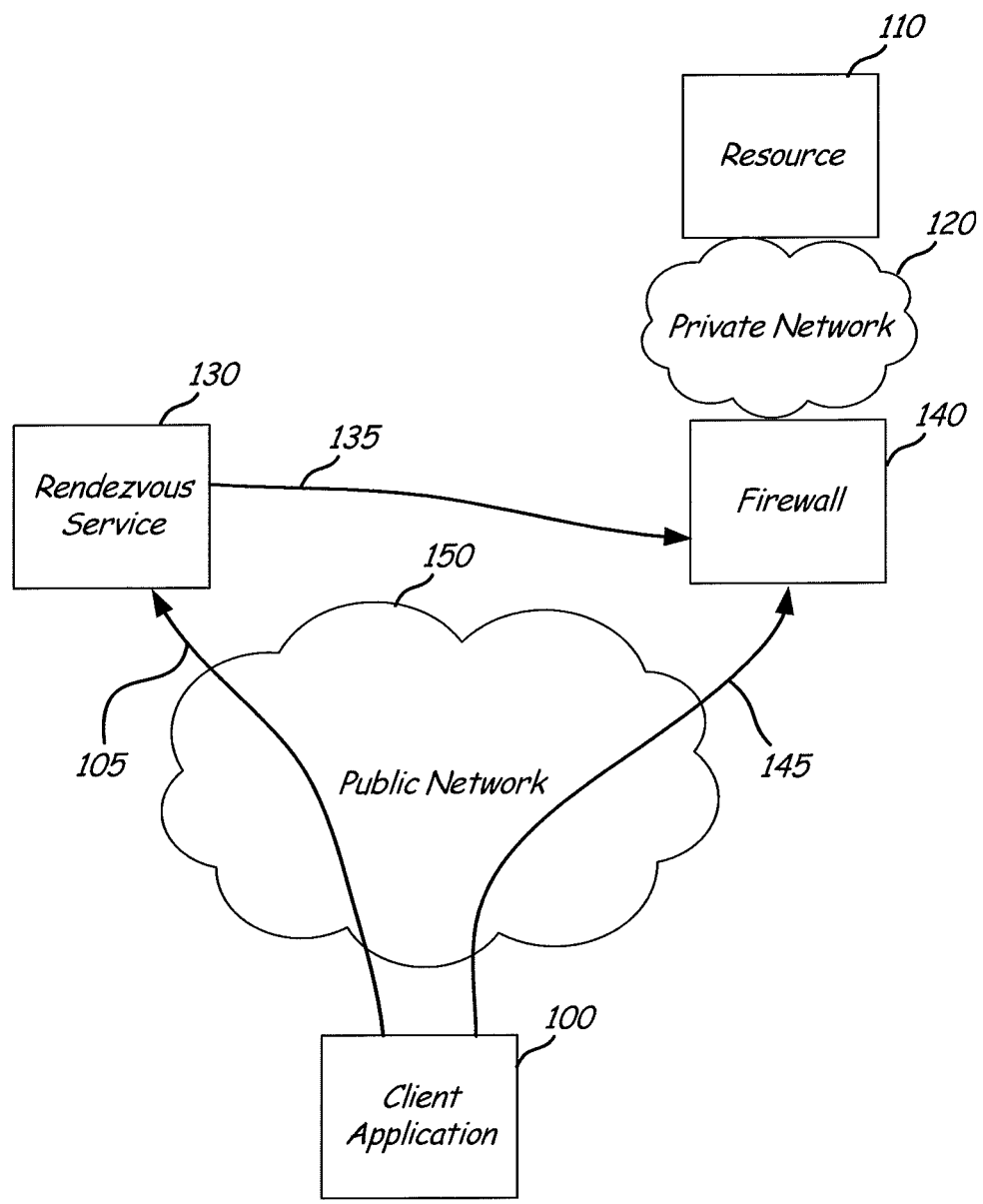
FIG. 1 is a schematic diagram of an embodiment of a client application that uses an electronic rendezvous service to access a resource of a private network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are systems and methods that use electronic rendezvous-based two stage access control for private networks. In one embodiment, access to a resource of a private network is controlled using a two stage authentication and authorization process. In the first stage, an independent rendezvous service is used to authenticate and authorize a client application that is attempting to access the resource of the private network. If the client application is successfully authenticated and authorized by the rendezvous service, the rendezvous service informs the private network that the client application has passed the first set of authentication and authorization processes. Based on that information, the private network allows the client application to enter the second stage in which the client application can attempt to be authenticated and authorized by a second set of authentication and authorization processes implemented by the private network. If the client application is successfully authenticated and authorized by the private network, the client application is allowed to access the resource of the private network. Accordingly, a client application must successfully complete a two stage process before being allowed to access a resource of the private network.

Additionally, in at least certain embodiments the private network is not discoverable from the rendezvous service, and the rendezvous service is not discoverable from the private network. Instead, the client application must independently connect to both the private network and the rendezvous service. Accordingly, security of the private network may be increased both by performing two authentication and authorization processes and by requiring that the client application attempting to access the private network resource knows how to independently connect to both the rendezvous service and the private network. Furthermore, embodiments may include additional features such as, but not limited to, using limited time frames for completing the authentication and authorization processes, using dynamic addresses for the private network and the rendezvous service, and using the rendezvous service to provide access control for multiple private networks. These and other features and advantages are described below and shown in the accompanying figures.

FIG. 1 is a schematic diagram of a client application 100 that accesses a resource 110 of a private network 120 using a rendezvous service 130. Resource 110 can include any resource, application, or service within private network 120. For instance, resource 110 could include a device such as a camera or printer, files such as multimedia or word processing files, or applications such as an electronic mail or database applications. Similarly, client application 100 can include any resource, application, or service that may need to access resource 110 of private network 120.

Client application 100 is communicatively coupled to rendezvous service 130 through public network 150 that can include any public network such as, but not limited to, the Internet. Additionally, client application 100 is communicatively coupled to resource 110 through a firewall 140. Firewall 140 optionally includes a router and is able to control and route communications between private network 120 and public network 150.

In an embodiment, client application 100 accesses resource 110 using a two stage process. In the first stage, client application 100 sends a request 105 to rendezvous service 130 through public network 150. Request 105 indicates that client application 100 would like to access resource 110. Based on request 105, rendezvous service 130 is prompted to perform a first set of authentication and authorization processes. The authentication process optionally includes verifying an identity of client application 100 or an identity of a user of client application 100, and the authorization process optionally includes verifying that client application 100 or the user of client application 100 is authorized to access resource 110.

If rendezvous service 130 determines that client application fails either the authentication or the authorization process, rendezvous service 130 performs no further action. However, if rendezvous service 130 determines that client application 100 passes the authentication and the authorization processes, rendezvous service 130 transmits a message 135 to firewall 140. Message 135 indicates that client application 100 has passed the rendezvous service authentication and authorization processes. Message 135 may also include an indication of a time such as a timestamp that indicates when client application 100 passed the rendezvous service authentication and authorization processes.

Next, client application 100 begins the second stage of the two stage process. Based on message 135, firewall 140 enables client application 100 to begin a second set of authentication and authorization processes. Client application 100 sends a request 145 to firewall 140. Request 145 indicates that client application 100 would like to access resource 110. Based on firewall 140 receiving an indication that client application 100 has passed the first set of authentication and authorization processes performed by rendezvous service 130, firewall 140 creates an entry point through the firewall that enables request 145 to pass through to resource 110. Resource 110 then begins performing the second set of authentication and authorization processes. Again, the authentication process optionally includes verifying an identity of client application 100 or an identity of a user of client application 100, and the authorization process optionally includes verifying that client application 100 or the user of client application 100 is authorized to access resource 110. Additionally, firewall 140 may only permit client application 100 to perform the second set of authentication and authorization processes within a limited time frame. For example, firewall 140 may establish a limited time frame in which client application 100 can be authenticated and authorized based on a timestamp sent in message 135.

In another embodiment, instead of resource 110 performing the second set of authentication and authorization processes, the second set of authentication and authorization processes can instead be performed by firewall 140. In such a case, firewall 140 may similarly set a limited time frame in which client application 100 can be authenticated and authorized.

If client application 100 passes the second set of authentication and authorization processes, client application 100 is allowed to access resource 110. The access to resource 110 may also have a limited time frame such that client application 100 would then need to repeat the two stage process to re-establish access with resource 110 after the limited time frame elapses.

Figure 2:
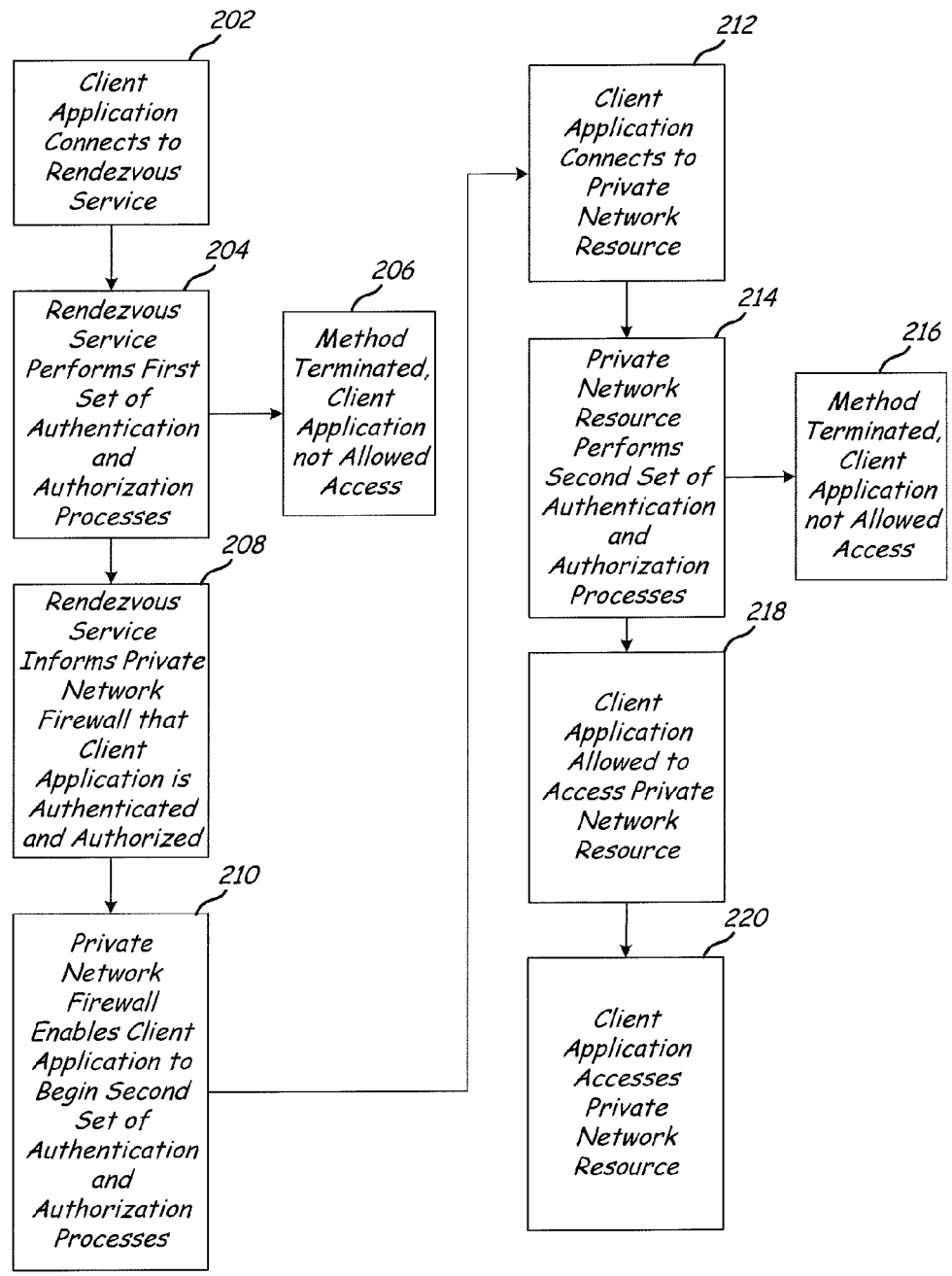
FIG. 2 is a flowchart of an embodiment of a method of using an electronic rendezvous service to access a resource of a private network.

FIG. 2 is a flowchart of a method of using an electronic rendezvous service to access a resource of a private network. At block 202, a client application connects to the rendezvous service. At block 204, the rendezvous service performs a first set of authentication and authorization processes. If the client application fails either the authentication or authorization process, the method is terminated at block 206, and the client application is not allowed to access the resource. However, if the client application passes both the authentication and authorization processes at block 206, the method continues to block 208.

At block 208, the rendezvous service informs a firewall of the private network that the client application passed the first set of authentication and authorization processes. The rendezvous service may also include an indication of a time (e.g., a timestamp) that indicates when the processes were passed.

At block 210, the private network firewall enables the client application to begin the second set of authentication and authorization processes. For instance, the private network firewall may create an entry point in the firewall that enables the client application to begin performing the second set of authentication and authorization processes with the private network resource. The private network firewall may only allow the client application to begin the second set of authentication and authorization processes for a limited time frame based on the time indication optionally sent at block 208. Also, the entry point may use a dynamic address (e.g., a dynamic Internet Protocol (IP) address) such that a same address is not used each time access to the private network resource is attempted.

At block 212, the client application connects to the private network resource, and at block 214, the private network resource attempts to perform the second set of authentication and authorization processes. If either the authentication or authorization processes fail, or if the authentication and/or authorization processes are not performed within the optional limited time frame, then the method is terminated at block 216, and the client application is not allowed to access the resource. However, if the client application passes the second set of authentication and authorization processes (and are optionally passed within the optional limited time frame), then the method continues to block 218.

At block 218, the client application is allowed to access the private network resource, and at block 220, the client application accesses the private network resource through the entry point in the firewall created at block 210. The entry point may only be open for a limited time frame such that it closes after the limited time frame, and the client needs to then repeat the two stage process to re-establish access with the private network resource. Additionally, the private network may implement a configurable activity timeout feature. For example, the private network can be configured such that the entry point stays open as long as there is traffic across the entry point and the entry point is closed if traffic across the entry point is idle for a certain amount of time.

Figure 3:
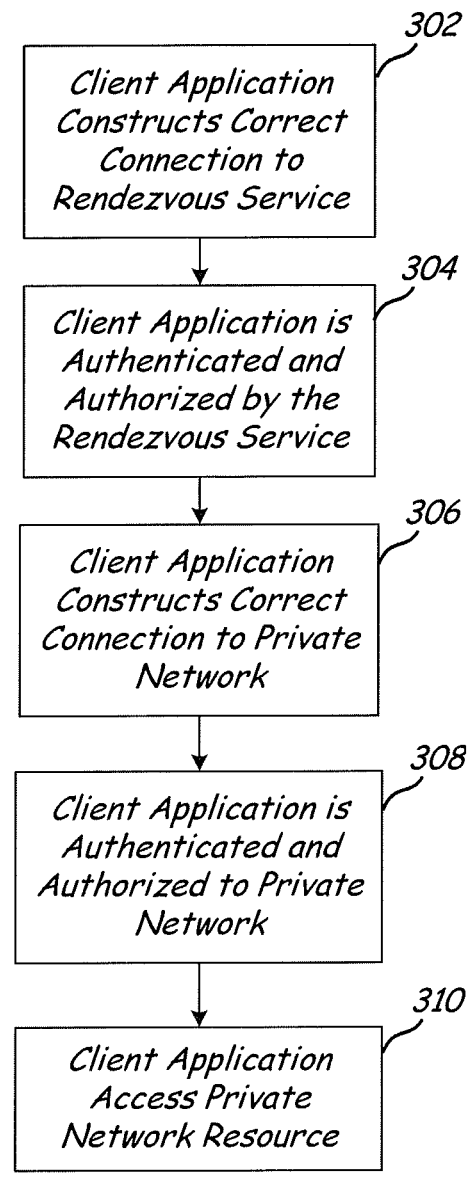
FIG. 3 is a flowchart of an embodiment of a method of using an electronic rendezvous service to access a resource of a private network from the perspective of a client application.

FIG. 3 is a flowchart of a method of using an electronic rendezvous service to access a resource of a private network from the perspective of a client application. At block 302, the client application constructs a correct connection to a rendezvous service. For example, the rendezvous service may be associated with a uniform resource locator (URL), and the client application connects to the URL.

At block 304, the client application is authenticated and authorized by the rendezvous service. The client application optionally sends information to the rendezvous service to complete the authentication and the authorization. For example, the client application can send a username, password, certificate, or any other information that may be used to perform authentication and authorization by the rendezvous service.

At block 306, the client application constructs a correct connection to the private network. For instance, a firewall of the private network may be associated with a URL, and the client application connects to the URL.

At block 308, the client application is authenticated and authorized by the private network (e.g., the client application is authenticated and authorized by a private network resource or a firewall of the private network). The client application optionally sends information (e.g., username, password, certificate, etc.) to the private network to complete the authentication and authorization processes.

At block 310, assuming that the rendezvous service and the private network authentication and authorization processes pass, the client application accesses the resource of the private network. If the client application fails any of the authentication or authorization processes, the method terminates at that step and the client application is not allowed to access the resource.

Figure 4:
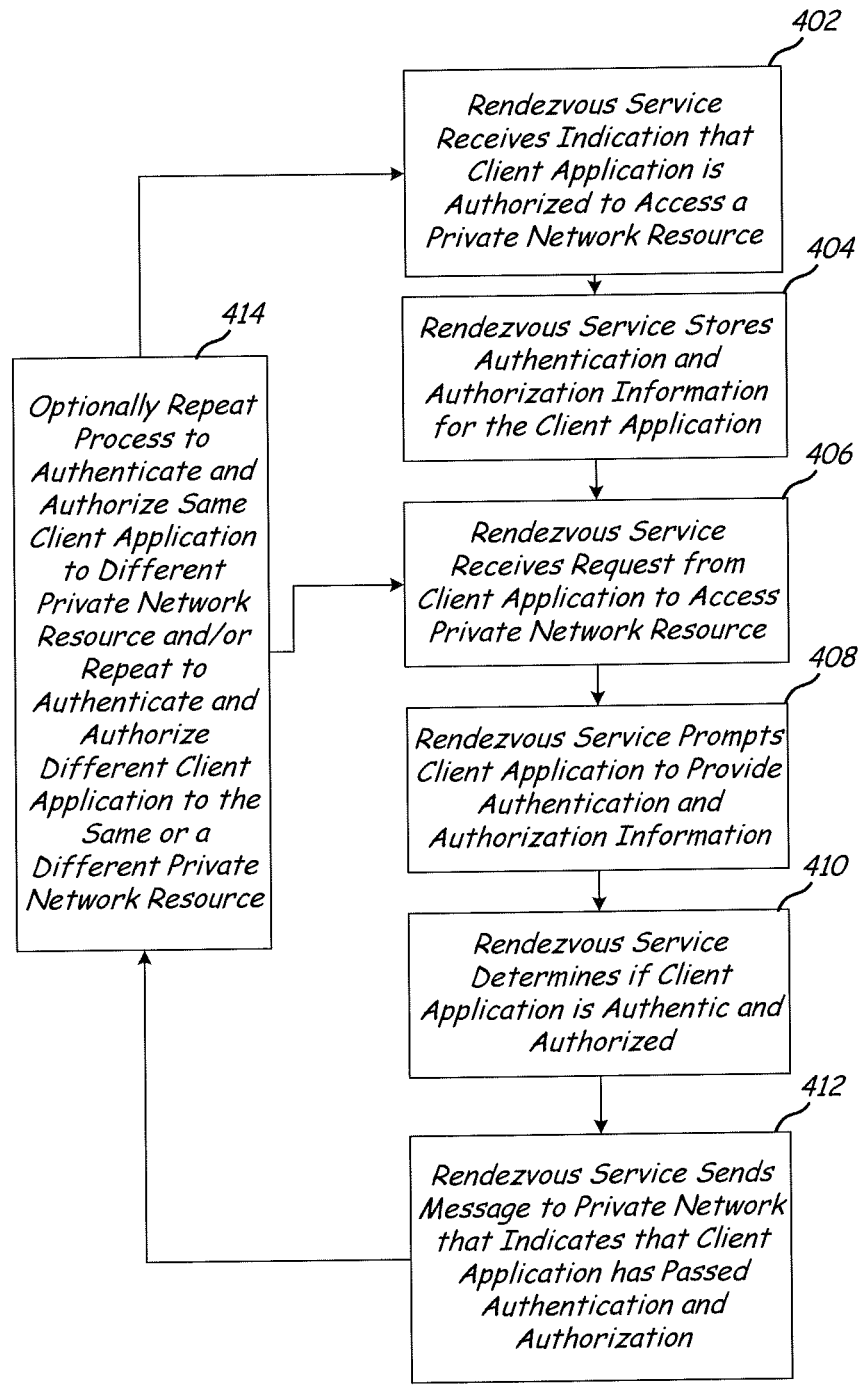
FIG. 4 is a flowchart of an embodiment of a method of using an electronic rendezvous service to access a resource of a private network from the perspective of the rendezvous service.

FIG. 4 is a flowchart of a method of using an electronic rendezvous service to access a resource of a private network from the perspective of the rendezvous service. At block 402, the rendezvous service receives an indication that a particular client application or a user of a client application is authorized to access a particular private network resource. The indication may be received from the private network resource and may include authentication and authorization information for the particular client application or user. The indication may also include authentication information of the private network such that only provisioned customers of the rendezvous service are allowed to set-up mappings. Furthermore, the indication may also optionally include information identifying a location of the private network resource or a location of a firewall or router associated with the private network resource. The information identifying the location may be direct information (e.g., a URL, etc.), or the information can be indirect information (e.g., a shared secret or random seed) that enables the rendezvous service to derive the location of the private network resource. Alternatively, the indication could identify a different location other than the private network where the rendezvous service can send a notice that a client application has passed a set of authentication and authorization processes. However, in yet another embodiment, the rendezvous service may not need to know any location information and instead the rendezvous service could merely respond to an authenticated connection initiated by the private network. In such a case, the connection initiated by the private network may be dynamic and transient to further increase security.

At block 404, the rendezvous service stores the information received at block 402. In an embodiment, the rendezvous service may optionally provide rendezvous services for a number of different resources within a private network and/or provide rendezvous services for a number of different private networks. Accordingly, the rendezvous service may store the information to a database or other storage medium that includes information for a number of different resources and/or private networks. Additionally, the rendezvous service may store the information using an opaque mapping system such that if information about any of the different resources and/or private networks is compromised, the information will not provide an unauthorized user with the information needed to connect to any of the different resources and/or private networks. For example, the rendezvous service may identify a service or private network by an arbitrary service identifier tag instead of identifying the service or private network by a URI.

At block 406, the rendezvous service receives a request from a client application to access a private network resource. The request may include information identifying the private network resource and/or information identifying the client application. For example, the request may identify an IP address of the client application. The rendezvous service may optionally apply filters based on information included in the request. For instance, the rendezvous service may restrict client applications having IP addresses from certain geographical regions from being authenticated and authorized. If any optional filters are applied and the client application does not pass the criteria, the method is terminated at block 406, and the client application is not allowed to access the private network resource. However, assuming that no optional filters are applied or that the client application passes the filter criteria, the method continues to block 408.

At block 408, the rendezvous service prompts the client application to provide authentication and/or authorization information (e.g., username, password, certificate, etc.), and the rendezvous service receives the information from the client application. The information may be sent over a secure connection/channel to prevent unauthorized interception of the information. Additionally, the rendezvous service optionally implements a limited time frame in which the client application can provide the information. If the client application does not provide the information or does not provide the information within the optional limited time frame, the client application is not allowed to access the private network resource. If the rendezvous service does receive the information (and it is optionally within the limited time frame), the method continues to block 410.

At block 410, the rendezvous service authenticates and/or authorizes the client application based on the information received from the client application at block 408 and based on the information received from the private network resource at block 402. For instance, the rendezvous service may authenticate the client application and then compare the identity of the client application to a list of authorized users for the private network resource. If the client application is not authenticated or authorized, the client application is not allowed to access the private network resource. If the rendezvous service determines that the client application is both authentic and authorized to access the private network resource, the method continues to block 412.

At block 412, based on a determination that the client application is authenticated and authorized to access the private network resource, the rendezvous service sends a message to the private network indicating that the client application has passed the rendezvous service authentication and authorization processes. The message is optionally sent to a firewall associated with the private network resource. The message may include identifying information of the client application (e.g., an IP address), an indication of a time (e.g., a timestamp) when the rendezvous service authentication and authorization processes were passed, and an indication of what private resource the client is attempting to access. The indication of what private resource the client is attempting to access can either be explicitly recited in the message or can be implicitly recited in the message (e.g., the message can implicitly indicate a private network resource based on the location the message is sent to or by a channel on which a response is sent). Additionally, instead of sending a message to the private network, the rendezvous service can send the message to a different location other than the private network (e.g., a different location specified at block 402) or could respond to a connection initiated by the private network.

At block 414, the process shown in FIG. 4 is optionally repeated. For instance, the process may be repeated by the rendezvous service to authenticate and authorize the same client application to a different private network resource, or the process may be repeated by the rendezvous service to authenticate and authorize a different client application to the same private network resource or to a different private network resource. Additionally, depending upon the configuration of the firewall associated with the private network resource, the same client application may need to be periodically re-authorized and/or re-authenticated to continue accessing the same private network resource. In such a case, the process shown in FIG. 4 is optionally repeated to re-authorize and/or re-authenticate the same client application to the same private network resource.

Figure 5:
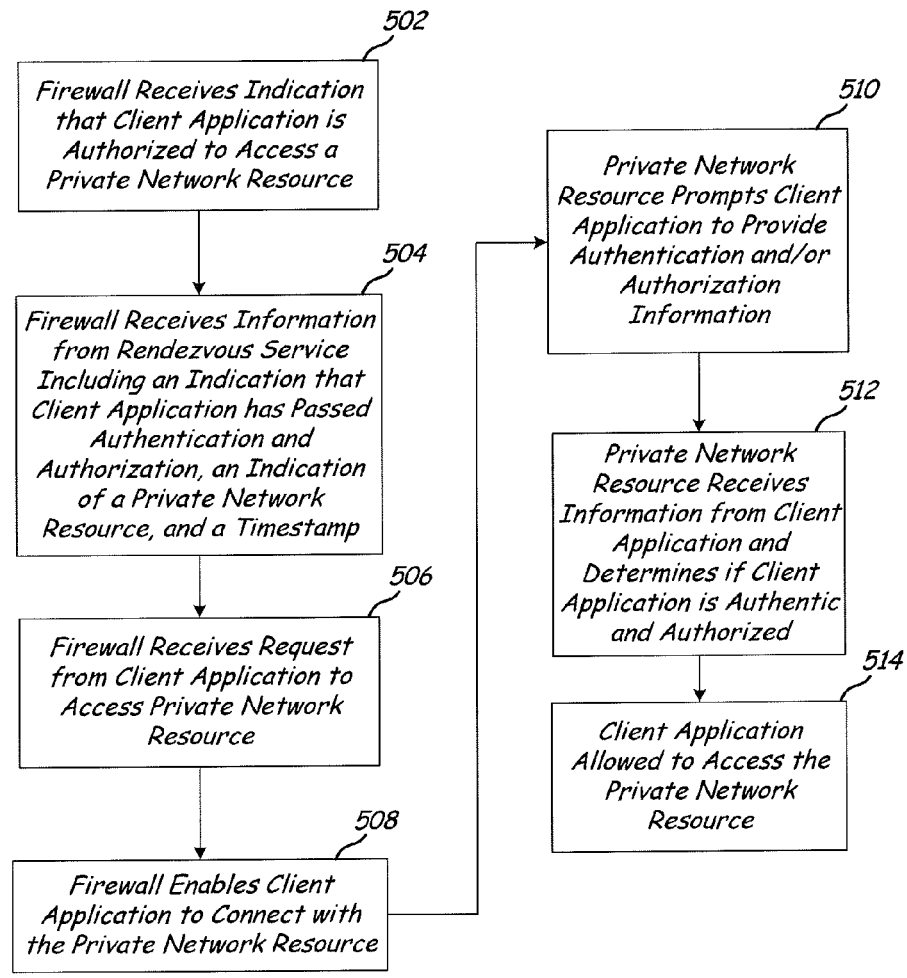
FIG. 5 is a flowchart of an embodiment of a method of using an electronic rendezvous service to access a resource of a private network from the perspective of a firewall associated with the private network and the private network resource itself.

FIG. 5 is a flowchart of a method of using an electronic rendezvous service to access a resource of a private network from the perspective of a firewall associated with the private network and the private network resource itself. It should be noted that although some steps may be indicated as being performed by either the firewall or the private network resource, that the steps are not limited to any particular configuration. Any of the steps shown in FIG. 5 can be performed by the firewall, by the private network resource, or by some other component depending upon the configuration and capabilities of the private network components.

At block 502, the firewall receives an indication that a client application or a user of a client application is authorized to access a particular private network resource, and the firewall stores the information. The indication may be received from the private network resource and may include authentication and authorization information for the particular client application or user. The indication is optionally stored to a memory (e.g., a cache, volatile memory, non-volatile memory, etc.) that includes information for multiple private network resources. Additionally, the firewall may be configured to have information about the rendezvous service and information about the private network resource. For instance, the firewall may be configured such that it has information that enables it to authenticate the rendezvous service and information to identify a private network resource that a client application is attempting to access. The private network resource information can either explicitly identify a private network resource or implicitly identify a private network resource (e.g., the information can implicitly identify a private network resource based on an arbitrary identifier such that the private network resource is not discoverable if the information is compromised).

At block 504, the firewall receives information from the rendezvous service that indicates that a client application has been authenticated and authorized by the rendezvous service. The information optionally identifies the client application and/or the user of the client application, identifies the private network resource, and includes an indication of time (e.g., a timestamp) associated with when the client application passed the rendezvous service authentication and authorization. Based on receiving the information at block 504, the firewall opens an entry point (e.g., a dynamic entry point) that enables the client application to being performing the second set of authentication and authorization processes.

At block 506, the firewall receives a request from the client application to access the private network resource. The request may include information identifying the private network resource and/or information identifying the client application. It is worth highlighting that the client application does not receive any information identifying the firewall from the rendezvous service. Accordingly, when the firewall receives the request from the client application at block 506, the client application must have independently acquired information about the firewall (e.g., an address of the firewall) from a source other than the rendezvous service. This ensures that the client application must not only pass the two authentication and authorization processes, but the client application must also know how to independently connect to both the rendezvous service and the firewall.

At block 508, based on receiving the indication that the client application has passed the first set of authentication and authorization processes at block 504 and based on receiving the request from the client application at block 506, the firewall enables the client application to connect with the private network resource to perform the second set of authentication and authorization processes. If the firewall has not received information indicating that the client application has passed the rendezvous service authentication and authorization, the method is terminated at block 508, and the client application is not allowed to access the private network resource. Additionally, the firewall may also prevent the client application from connecting with the private network resource based on how much time has passed since the client application was authenticated and authorized by the rendezvous service (e.g., the firewall can use a timestamp received at block 504 to close an entry point after a certain amount of time has passed since the rendezvous service authenticated and authorized the client application). Accordingly, if the amount of time that has passed exceeds a predetermined allowed time frame, the method is terminated at block 508, and the client application is not allowed to access to the private network resource. However, assuming that the client application has correctly connected to the firewall, that the firewall has received an indication from the rendezvous service that the client application passed its authentication and authorization processes, and that the client application request is optionally received within a predetermined time frame, the method continues to block 510.

At block 510, the private network resource prompts the client application to provide authentication and/or authorization information (e.g., username, password, certificate, etc.), and the private network resource receives the information from the client application. The private network resource optionally implements a limited time frame in which the client application can provide the information. If the client application does not provide the information or does not provide the information within the optional limited time frame, the client application is not allowed to access the private network resource. If the private network resource does receive the information (and it is optionally received within the limited time frame), the method continues to block 512.

At block 512, the private network resource authenticates and authorizes the client application based on the information received at blocks 502 and 510. For instance, the private network resource may authenticate the client application and then compare the identity of the client application to a list of authorized users for the private network resource. If the client application is not authenticated or authorized, the client application is not allowed to access the private network resource. If the private network resource determines that the client application is both authentic and authorized to access the private network resource, the method continues to block 514.

At block 514, the client application is allowed to access the private network resource. The private network resource may limit the access to a limited amount of time such that the client application needs to repeat the two stage process if the client application would like to continue accessing the private network resource after the limited amount of time has expired. Additionally, the private network resource may assign dynamic entry points through the firewall such that a same entry point though the firewall is not used every time the private network resource is accessed. For instance, the firewall may assign a new entry point through the firewall each time the private network resource is accessed.

Figure 6:
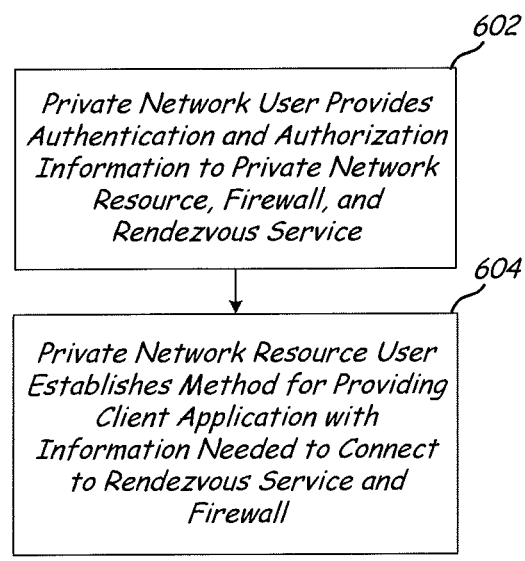
FIG. 6 is a flowchart of an embodiment of a method of using an electronic rendezvous service to access a resource of a private network from the perspective of a private network resource user.

FIG. 6 is a flowchart of a method of using an electronic rendezvous service to access a resource of a private network from the perspective of a private network resource user. At block 602, the private network user (e.g., a person or system using the private network resource) provides authentication and/or authorization information to the private network resource, the firewall, and the rendezvous service. The information optionally indicates what client applications or client application users are authorized to access the private network resource and what authentication information is needed from the client application or client application users to authenticate the client application or client application users.

At block 604, the private network user establishes a method for providing the client application with the information needed to connect to the rendezvous service and the firewall. As previously mentioned, the information needed to connect to the rendezvous service is not discoverable from the firewall, and the information needed to connect to the firewall is not discoverable from the rendezvous service. Accordingly, the connection information for the rendezvous service and the firewall must be provided to the client application separately from the rendezvous service and the firewall authentication and authorization processes. In one embodiment, a shared random seed is provided to the client application, the rendezvous service, and/or the firewall. The client application, the rendezvous service, and/or the firewall use the shared random seed along with matching algorithms to synchronize the systems such that each of the systems can independently establish the same connection paths. In another embodiment, the connection information is encrypted and is sent to the client application, the rendezvous service, and/or the firewall, and an encryption key needed to decrypt the information is optionally separately provided to the client application, the rendezvous service, and/or the firewall. Embodiments of the present disclosure are not however limited to any particular method, and embodiments can include any method of providing the client application with the information needed to connect to the rendezvous service and the firewall.

Figure 7:
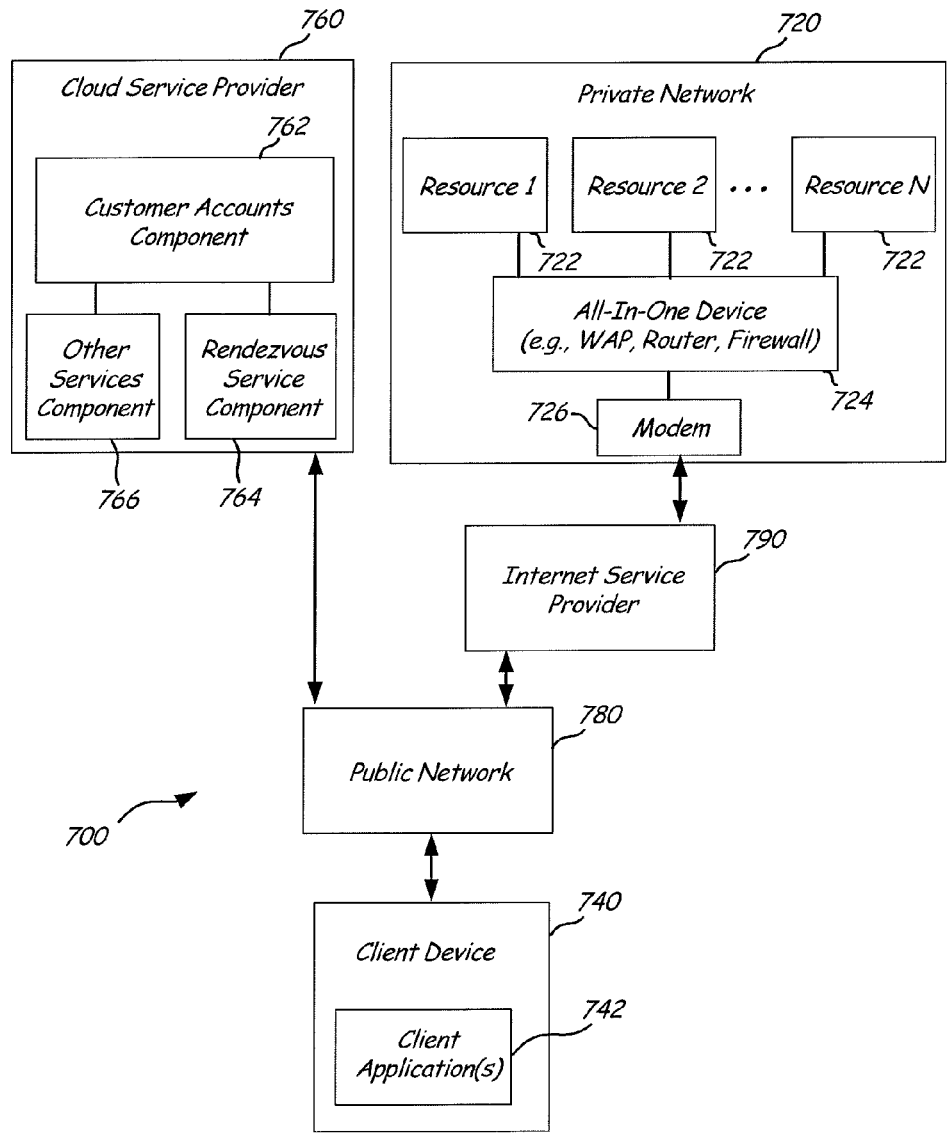
FIG. 7 is a schematic diagram of a system that can be used to implement an electronic rendezvous-based access control method.

FIG. 7 is a schematic diagram of a system 700 that can be used to implement a two stage electronic rendezvous-based access control method. Embodiments of the present disclosure are not however limited to any particular system or configuration and can be implemented in systems differing from the specific example shown in FIG. 7.

System 700 includes a private network 720, a client device 740, and a cloud service provider 760. Client device 740 and cloud service provider 760 are optionally directly connected to a public network 780, and private network 720 is optionally indirectly connected to public network 780 through an internet service provider 790. Accordingly, client device 740 and cloud service provider 760 can send and receive information directly over public network 780, and private network 730 can send and receive information over public network 780 indirectly through internet service provider 790.

Private network 720 includes N resources 722, where N includes any number (e.g., 0, 1, 2, 3, etc.). Each resource 722 may include any resource, application, or service. For instance, some examples of resources include, but are not limited to, a device such as a camera or a printer, files such as a multimedia or word processing file, and an application such as an email or a database application.

Resources 722 are connected to an all-in-one device 724. In an embodiment, all-in-one device 724 provides wireless access point (WAP) functionality, router functionality, and firewall functionality in one device. Alternatively, all-in-one device 724 could be implemented in separate components. The router functionality of all-in-one device 724 may include a NAT module. The NAT module translates between private addresses used by resources 722 within private network 720 and one or more public addresses provided by internet service provider 790 through a modem 726. For example, if a communication intended for one of resources 722 is received at all-in-one device 724, the NAT module is used to translate the public network address into a private network address, which is then used to forward the communication to the correct resource 722. In an embodiment, the NAT module is able to dynamically change the public address associated with a private network resource such that the same public address is not used to access the private network resource multiple times.

Cloud service provider 760 includes a customer accounts component 762, a rendezvous service component 764, and other services component 766. Customer accounts component 762 optionally includes a database or other storage medium that stores account information for multiple customers. For example, each customer may have a number of resources that use rendezvous service component 764. Customer accounts component 762 can include the authentication and/or authorization information for all of the resources provided by the multiple customers. Additionally, customer accounts component 762 may store the information using an opaque mapping system such that if information about any of the customers and/or resources is compromised, the information will not provide an unauthorized user with the information needed to connect to any of the customers' private networks and/or resources. For example, the customer accounts component 762 may identify customers and resources by arbitrary identifier tags instead of identifying the customers and resources by a URI.

Rendezvous service component 764 provides the functionality to provide the rendezvous services described above and shown in the accompanying figures. For example, rendezvous service component 764 can be used to implement the method shown in FIG. 4 to provide an application 742 of a client device 740 with access to one of the private network resources 722.

Other services component 766 represents the fact that cloud service provider 760 can optionally provide any other services in addition to the rendezvous services. For example, other services component 766 can be used to provide software as a service, storage as a service, desktop virtualization, etc. Accordingly, cloud service provider 760 can provide rendezvous services using rendezvous service component 764 and can also provide any other services using other services component 766. As previously mentioned, the particular embodiment shown in FIG. 7 is given merely for illustration purposes only, and embodiments are not limited to any particular network or network configuration.

As has been described above and shown in the accompanying figures, embodiments of the present disclosure include systems and methods that use electronic rendezvous-based two stage access control for private networks. In one embodiment, access to a resource of a private network is controlled using a two stage authentication and authorization process. In the first stage, an independent rendezvous service is used to authenticate and authorize a client application that is attempting to access the resource of the private network. If the client application is successfully authenticated and authorized by the rendezvous service, the rendezvous service informs the private network that the client application has passed the first set of authentication and authorization process. Based on that information, the private network allows the client application to enter the second stage in which the client application is authenticated and authorized by a second set of authentication and authorization processes implemented by the private network. If the client application is successfully authenticated and authorized by the private network, the client application is allowed to access the resource of the private network. Accordingly, a client application must successfully complete a two stage process before being allowed to establish access with a resource of the private network.

In at least certain embodiments, the private network is not discoverable from the rendezvous service, and the rendezvous service is not discoverable from the private network. Instead, the client application must independently connect to both the private network and the rendezvous service. Accordingly, security of the private network may be increased both by performing two authentication and authorization processes and by requiring that the client application trying to gain access knows how to independently connect to both the rendezvous service and the private network. Therefore, a client application trying to gain unauthorized access (e.g., a "hacker") must not only hack the rendezvous service, but the client application must also know where the private application or resource is located. Furthermore, embodiments may include additional features such as, but not limited to, using limited time frames for completing authentication and authorization processes, using dynamic addresses for the private network and the rendezvous service, and using the rendezvous service to provide access control for multiple private networks.

Figure 8:
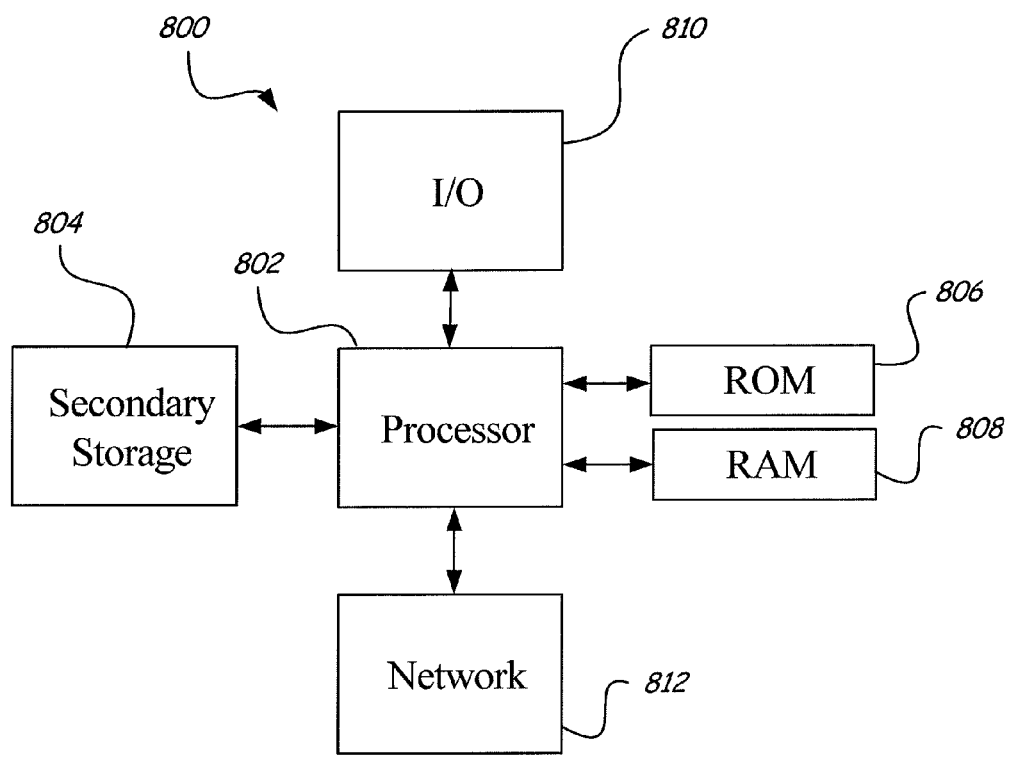
FIG. 8 is a schematic diagram of an embodiment of a general-purpose computer system.

The methods and components described above may be implemented on any general-purpose network component, such as a computer or network component with sufficient processing power, memory resources, and network throughput capability to handle the necessary workload placed upon it. FIG. 8 illustrates a schematic diagram of a general-purpose network component or computer system 800 suitable for implementing one or more embodiments of the methods or components disclosed herein. The general-purpose network component or computer system 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. Although illustrated as a single processor, the processor 802 is not so limited and may comprise multiple processors. The processor 802 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 802 may be configured to implement any of the schemes described herein. The processor 802 may be implemented using hardware, software, or both.

The secondary storage 804 is typically comprised of one or more disk drives or tape drives and is used for non-volatile storage of data and as an over-flow data storage device if the RAM 808 is not large enough to hold all working data. The secondary storage 804 may be used to store programs that are loaded into the RAM 808 when such programs are selected for execution. The ROM 806 is used to store instructions and perhaps data that are read during program execution. The ROM 806 is a non-volatile memory device that typically has a small memory capacity relative to the larger memory capacity of the secondary storage 804. The RAM 808 is used to store volatile data and perhaps to store instructions. Access to both the ROM 806 and the RAM 808 is typically faster than to the secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for providing access to a private network resource comprising:
    receiving an indication from an electronic rendezvous service that a client application has passed a first set of authentication and authorization processes before the private network resource has been contacted, wherein the indication comprises a time that indicates when the client application passed the first set of authentication and authorization processes;
    receiving a request from the client application to access the private network resource;
    allowing the client application to attempt to perform a second set of authentication and authorization processes based at least in part on both receiving the indication from the electronic rendezvous service that the client application has passed the first set of authentication and authorization processes and receiving the request from the client application to access the private network resource within a set limited amount of time after the client application passed the first set of authentication and authorization processes;
    performing the second set of authentication and authorization processes; and
    enabling the client application to access the private network resource based at least in part on a determination that the client application has passed the first set of authentication and authorization processes and the second set of authentication and authorization processes,
    wherein enabling the client application to access the private network resource comprises enabling the client application to access the private network resource based at least in part on the determination that the client application has passed the first set of authentication and authorization processes and the second set of authentication and authorization processes within a predetermined time frame, and
    wherein at least one of the receiving allowing, performing, and enabling steps is implemented in hardware.

2. The method of claim 1, wherein enabling the client application to access the private network resource comprises enabling the client application to access the private network resource for a limited amount of time after the second set of authentication and authorization processes are completed.

3. The method of claim 1, wherein enabling the client application to access the private network resource comprises creating the dynamic entry point in a firewall associated with the private network.

4. The method of claim 3, wherein creating a dynamic entry point comprises changing a public address associated with the private network resource in a network address translation module.

5. The method of claim 1, wherein the first set of authentication and authorization processes comprises the electric rendezvous service authenticating and authorizing the client application, and wherein the second set of authentication and authorization processes comprises the private network authenticating and authorizing the client application.

6. An apparatus for providing access to a private network resource comprising:
    an interface configured to receive an indication from an electronic rendezvous service that a client application has passed a first set of authentication and authorization processes before the private network resource has been contacted, wherein the indication comprises a time that indicates when the client application passed the first set of authentication and authorization processes; and a processor configured to perform a second set of authentication and authorization processes and enable the client application to access the private network resource based at least in part on both a determination that the client application has passed the first set of authentication and authorization processes and the second set of authentication and authorization processes within a predetermined time frame and a determination that a request from the client application to access the private network resource has been received within a set limited amount of time after the client application passed the first set of authentication and authorization processes.

7. The apparatus of claim 6, further comprising a storage medium configured to store authentication and authorization information for the private network resource and for other resources of the private network.

8. The apparatus of claim 6, further comprising a firewall configured to dynamically open an entry point that enables the client application to access the private network resource based at least in part on the determination that the client application has passed the first set of authentication and authorization processes and the second set of authentication and authorization processes.

9. The apparatus of claim 8, wherein the firewall comprises a network address translation module configured to change a public address associated with the private network resource.

10. The apparatus of claim 8, wherein the firewall is configured to dynamically open the entry point for a limited amount of time.

\* \* \* \* \*